United States Patent [19]
Iadipaolo et al.

[11] 3,821,624
[45] June 28, 1974

[54] CONTROL SYSTEM INCORPORATING PLURAL INCREMENTAL DRIVE UNITS

[75] Inventors: Rene M. Iadipaolo, Southfield; William B. Jones, Huntington Woods, both of Mich.

[73] Assignee: Tested Electronic Computer Hardwares and Softwares, Inc., Livonia, Mich.

[22] Filed: June 29, 1972

[21] Appl. No.: 267,339

[52] U.S. Cl. .......... 318/603, 318/696, 235/150.1 R, 235/151.1
[51] Int. Cl. ........................................ G05b 23/02
[58] Field of Search...... 318/603, 696; 235/150.1 R, 235/151.1

[56] References Cited
UNITED STATES PATENTS

| | | | |
|---|---|---|---|
| 3,075,700 | 1/1963 | Bishop | 235/150.1 |
| 3,297,929 | 1/1967 | Gardner et al. | 318/696 X |
| 3,416,054 | 12/1968 | Galles | 318/696 |
| 3,526,757 | 9/1970 | Rees et al. | 235/151.1 X |
| 3,643,146 | 2/1972 | Ferguson | 318/603 X |
| 3,659,813 | 3/1971 | Clark et al. | 318/696 X |
| 3,665,280 | 5/1972 | Payne et al. | 318/603 X |

*Primary Examiner*—B. Dobeck
*Attorney, Agent, or Firm*—Fisher, Krass, Young & Gerhardt

[57] ABSTRACT

The operation of a process is automatically regulated by a computer which receives the outputs of sensors connected to measure various parameters of the process, and generates control signals to modify the state of certain process variables. The variables are controlled through electrical signals generated by potentiometers driven by stepping motors. Based on its inputs the computer calculates desired changes in the settings of the various potentiometers in terms of increments of the stepping motor drives. These motion increments for each of the stepping motors are stored in memory sections associated with the steppers. At a particular point in the computer cycle the memory sections are sequentially scanned, an output pulse is provided to a particular stepper if its contents are non-zero and the contents of a particular memory section are decremented by one unit. This process is repeated at regular intervals in the cycle of operation of the system.

14 Claims, 3 Drawing Figures

CONTROL SYSTEM INCORPORATING PLURAL INCREMENTAL DRIVE UNITS

BACKGROUND OF THE INVENTION

1. Field of the Invention

This invention relates to automatic process control systems of the type employing incremental output drives and more particularly to such systems including unique means for providing control signals to the output drives.

2 Prior Art

Automatic systems which measure operating parameters of a process and modify variables of the process to control the process in accordance with predetermined criteria often employ output devices which are controllable in an incremental manner. Stepping motors are the most common form of such incremental output devices. These motors rotate their output shafts through a particular increment in response to each pulse of electrical current supplied to them. They are low in cost, reliable in operation and easily applicable in a wide range of physical circumstances. Their mechanical outputs may be used to directly actuate control elements such as valves or the shafts may be connected to the movable elements of potentiometers to develop output currents which are proportional to the positions of the motor shafts. Other forms of devices which accept incremental signals in the form of electrical current pulses and provide proportional outputs include sample and hold amplifiers and bidirectional digital servo systems.

When a plurality of such incremental output devices are employed in a control system, the cost and complexity of the circuitry for providing control pulses for these motors becomes a significant factor in the cost of the total system. The design of this pulse-producing apparatus is complicated by the fact that the maximum rate at which the incremental device can accept the control pulses is generally much slower than the rate of operation of the balance of the system. When stepping motors are employed, their maximum pulsing rate may be on the order of hundreds of pulses per second while the solid state circuitry of the balance of the control system can operate at rates which are more than an order of magnitude faster.

SUMMARY OF THE PRESENT INVENTION

The present invention is accordingly addressed to an automatic control system employing a plurality of incremental output drive units which utilizes a unique system for generating the control signals for these output members. The system of the invention substantially reduces the logical circuitry required to service the multiple output drives and allows them to be serviced in a manner which accommodates their relatively low rate to the higher speed operation of the balance of the system.

Broadly, the present invention provides a system wherein the required motions of each of the output members are regularly calculated and stored in a series of memory sections in the form of numerical commands representing multiples of the incremental output motions. At regular intervals in the cycle of operation of the system these memory sections are sequentially scanned and each section is tested to determine if it is non-zero. If this is the case, a single output pulse is provided to the incremental drive unit associated with the particular memory section being tested. The pulse is provided in such a manner as to cause an output motion in a direction that is dependent upon the sign of the number contained in that particular memory section. If the contents of the memory section are non-zero a ONE is either added or subtracted from the contents, depending again upon the sign of the contents, so as to decrement the contents by one unit. The subsequent memory sections are then sequentially processed in the same manner. The system then proceeds with other tasks associated with calculating necessary modifications to the incremental commands and processing these modifications and then repeats the scanning, signal generating and memory modifying sequence.

By this arrangement each output device receives at most a single pulse during any servicing cycle. The servicing cycles can occur at rates compatible with the stepping motor's maximum pulse reception rate and the other operations which the system must perform, such as scanning outputs, sensing their values may be sandwiched between the generation of command pulses for the output devices and thus may be conducted at very high rates.

Since only a single pulse is provided to a stepping motor during a single servicing routine, and the equipment for generating these pulses is time-shared between all of the output devices, the apparatus employed in connection with the present invention is greatly simplified relative to prior control systems of this variety. Another advantage accruing to this system is the simplification in programming when a general purpose computer is used to implement the control system. The entire output servicing routine can be called forth by a single software command which places the hardware into action.

Other objects, advantages and applications of the present invention will be made apparent by the following detailed description of a preferred embodiment of the invention. The description makes reference to the following drawings in which.

Figure 1:
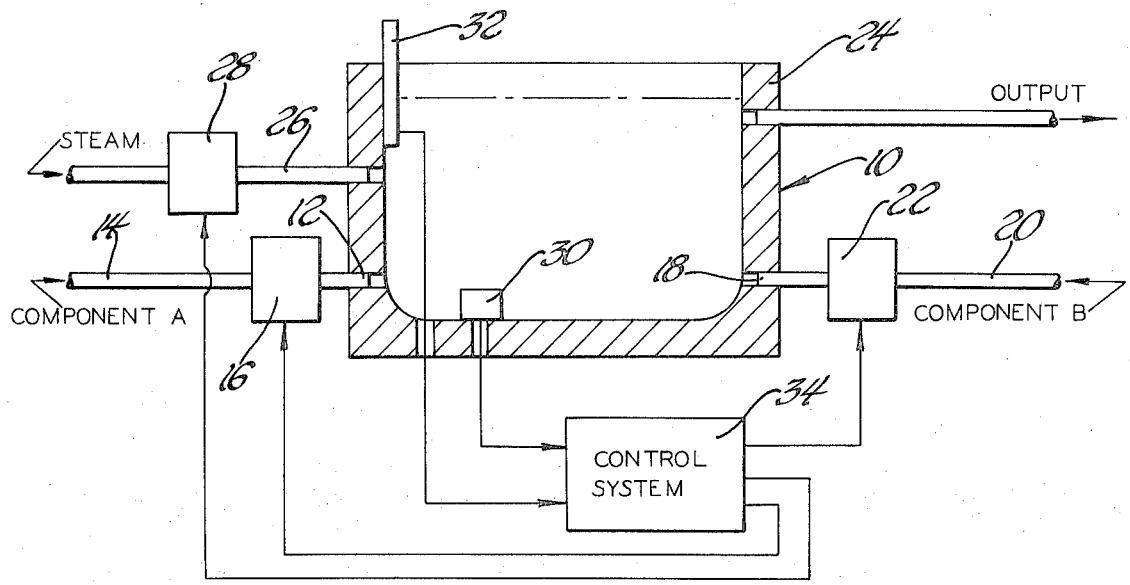
FIG. 1 is a schematic view of a chemical processing tank regulated by a control system formed in accordance with the present invention.

Control systems formed in accordance with the present invention are applicable to a wide range of processes wherein a plurality of input variables are adjusted to levels which are functions of one or more measured parameters of the process. For purposes of illustration, the preferred embodiment of the invention is illustrated in FIG. 1 as being connected to control a process taking place in a heated vat 10. The vat has a first inlet 12 which receives the flow from a conduit 14 as controlled by an adjustable valve 16. The valve may be of the electromechanical variety. A component "A" is introduced to the vat through the inlet 12. Another component "B" is also introduced to the vat 10 through an inlet 18 by means of a conduit 20 with the flow controlled by a second valve 22. The components are to be mixed or reacted within the vat 10 and the vat is equipped with a steam jacket 24 through which steam may be introduced via a conduit 26 controlled by a third electromechanical valve 28.

The vat is equipped with a temperature sensing transducer 30 and a liquid level sensing transducer 32, both of which provide electrical output signals to the control system 34. The system 34 acts to provide control signals to the valves 16, 22 and 28 which adjust the inputs to the process so that a predetermined level of fluid is maintained in the vat at a predetermined temperature. The control system would also preferably control the ratio of the components "A" and "B" which are admitted to the vat.

The exact manner in which the valves are regulated as a function of the outputs of the transducers 30, 32 is not of importance in the present invention. For purposes of illustration, we may assume that the position of the valve 28 which emits steam through the jacket 24 and is regulated as a linear function of the output transducer 32. Thus, at periodic intervals, the output of the transducer 32 may be compared with a pre-adjusted value, or "set point," and the valve is then adjusted by an amount and in a direction which is dependent upon the difference between the sensor signal and the set point. Similarly, the control system might be adjusted to provide equal flows of the components A and B and assuming their pressures and viscosities to be identical, identical signals might be sent to the valves 16 and 22 which signals are a function of the difference between the output of the liquid level sensor 32 and a set point.

Figure 2:
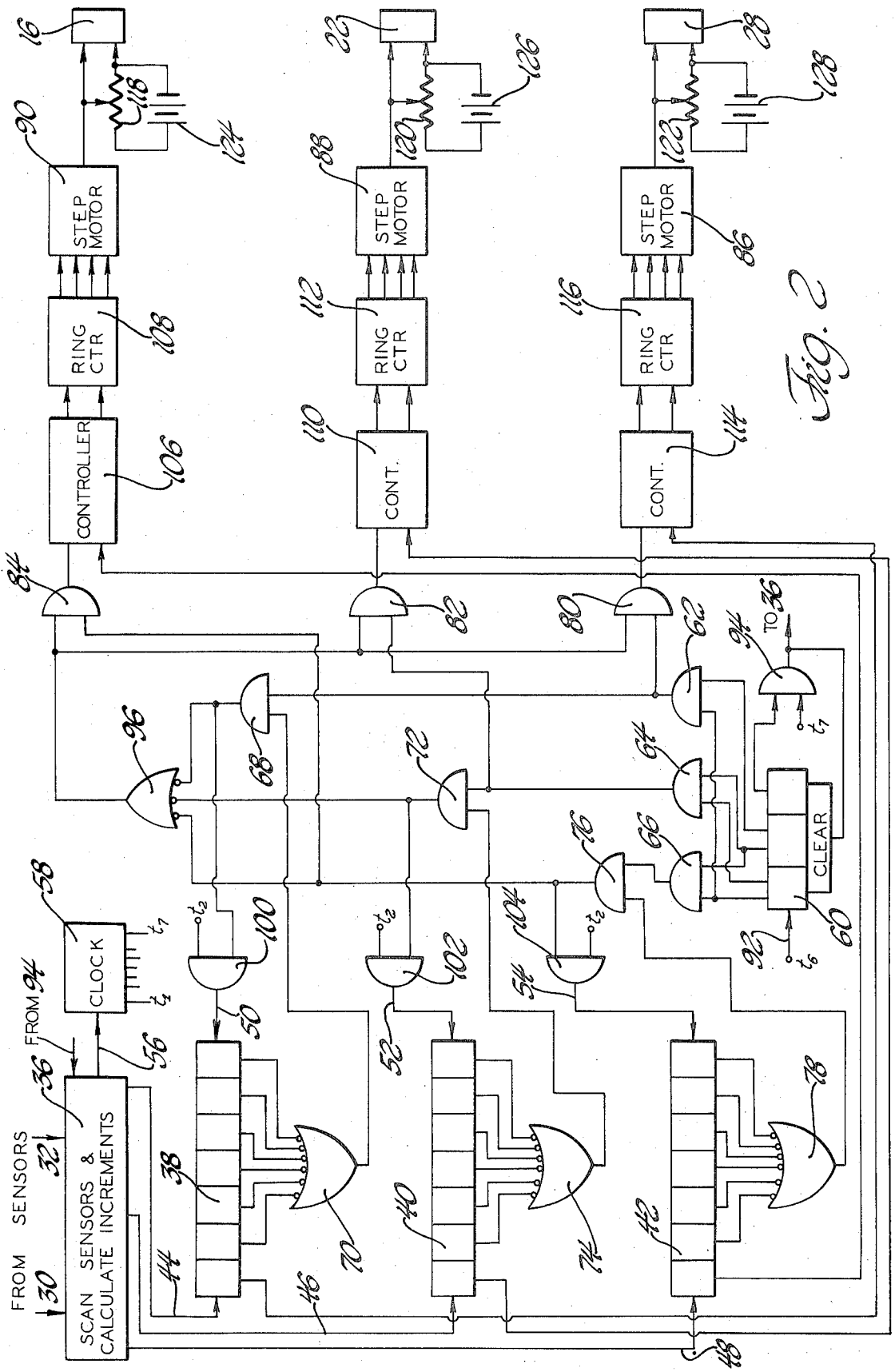
FIG. 2 is a partially schematic, partially block diagram of that portion of the control system which embodies the present invention.

FIG. 2 illustrates the control system 34 in partially block and partially schematic form with those sub-systems that are unique to the present invention illustrated in more detailed schematic form.

The outputs from the sensors 30 and 32 are provided to a sub-system 26 which employs the sensor signals to calculate numbers which represent desired changes in the positions of the output valves. These changes are represented by binary numbers indicating the number of outputs of the stepping motor drives which control the valves 16, 22 and 28. The numbers have seven bits with the most significant bit constituting a sign. The presence of a ONE in the most significant bit position indicates an increment in a first direction (which will be termed the negative direction) and a ZERO calls for movement in the opposite direction. With the six bits of numerical information the commands can call for up to 63 increments of the stepping motor.

The exact organization of the sub-system 36 and the manner in which it scans the outputs of the sensors and calculates the increments does not form part of this present invention but may take any of the conventional forms known to the prior art. This circuitry may be implemented by either hardware or a suitably programmed general purpose computer. A wide variety of systems of this nature are known to the art.

The sub-unit 36 calculates three separate increments quantities for the valves 16, 22 and 28 respectively and, at appropriate points in its operational cycle, provides them to counter-registers 38, 40 and 42 respectively. These registers, subsequently referred to as the increment registers, are seven place binary counters. They may be preset serially or in parallel. The increment values are provided to them from the subsystem 36 on lines 44, 46 and 48. These same registers 38, 40 and 42 may be decremented by one bit at a time by pulses provided respectively on lines 50, 52 and 54.

When the sub-system 36 has completed its cycle of scanning the sensors, calculated the increment quantities, and loaded them into the registers 38, 40 and 42, it provides an output on line 56 to a clock 58 constituting a ring counter which provides a recurrent sequence of signals on seven output lines labelled $T_1$ through $T_7$. This clock 58 synchronously controls the balance of the circuitry to provide control pulses which operate to modify the positions of the valves 16, 22 and 28 in a manner which will subsequently be described.

In the operation of the control pulse emitter circuitry the registers 38, 40 and 42 are successively scanned through a memory address register 60. This is a three-bit counter which is set to 001 at the beginning of the cycle of the clock 58. Both the high and low outputs of each of the stages of the clock 60 are provided to three AND gates 62, 64 and 66. These AND gates are connected to the first two stages of the counter 60 so that the AND gate 62 provides an output when the count of 001 is contained in the counter, the AND gate 64 provides an output when the count of 010 is contained in the counter and the AND gate 66 provides an output when the count of 011 is contained in the counter.

Accordingly, initially an output is provided by the AND gate 62. That output is provided to another AND gate 68 which is also conditioned by the output of an OR gate 70. In a similar manner, the AND gate 64 provides an output when a count of two is contained within the counter 60 and its output is provided to an AND gate 72 which is also conditioned by the output of an OR gate 74. The third AND gate 66 provides an output when a count of three or 011 is contained in register 60. Its output conditions an AND gate 76 which also receives the output of an OR gate 78.

In this manner, the register 60 selectively scans the outputs of the gates 70, 74 and 78.

The outputs of the gates 62, 64 and 66 are also provided to three AND gates 80, 82 and 84 respectively which each activate circuits associated with one of three step motors 86, 88 and 90, respectively, as will be subsequently described. Thus, the register 60 effectively scans the increment registers and the step motors on a one-for-one basis as its contents are modified. Its contents are modified by a timing pulse $T_6$ from the clock 58 provided on line 92 so that once in each cycle the clock 58 and the contents of the register 60 are modified so as to scan the different register and step motor. When the contents of the register 60 reach a count of four or 100, an output is provided to an AND gate 94 which is also conditioned by $T_7$ pulse from the clock 58. This provides an output to the sub-system 36 which re-initiates that unit's operation and terminates the output on line 56, thus halting operation of the clock 58.

The OR gates 70, 74 and 78 each connect to those six stages of its associated register which contain the increment number. Thus, the gate 70 senses each of the six stages of the counter 38 which contains the increment numbers (the seventh stage contains the sign of the number) and provides an output when any of the bit contained in those six stages is non-zero; i.e., whenever the number itself is non-zero. This output is provided to the AND gate 68 and if an output is simultaneously received from the AND gate 62, indicating that the increment counter 38 is being scanned, a signal is provided to an OR gate 96. This OR gate provides its output to the AND gates 80, 82 and 84 which select one of the step motors for actuation. Whichever step motor is energized by a signal from the gates 62, 64 and 66, thus receives a pulse. The output of the gate 68 is also provided to an AND gate 100 conditioned by the timing pulse $T_2$ which provides an output on line 50, decreasing the count in the register 38 by one unit.

In a similar manner, the OR gate 74 senses the state of the counter 40 and provides an output to the AND gate 72 when the contents are non-zero. The AND gate 72 provides its signal to the OR gate 96 and at $T_2$ to the line 52 through an AND gate 102. The OR gate 78 provides an output if the contents of the register 42 are non-zero to an AND gate 76. At $T_2$ an output from the AND gate 76 acts through the AND gate 104 to provide a pulse on line 54 which decrements the contents of the register 42 by one unit.

The step motors 86, 88 and 90 are of the type having four output windings and they are controlled in a bidirectional manner by a system which is disclosed in detail and claimed in co-pending application Ser. No. 227,546, assigned to the assignee of the present invention. Broadly, when the step motor 90, for example, is to be energized, a pulse from the gate 84 is applied to a controller 106. The controller also receives a signal from the most significant stage of the counter 42 which indicates the sign of the number contained in the counter. If the sign is zero so that the number is positive, the controller 106 simply gates a single one of the clock pulses ($T_3$) to a ring counter 108 which steps so as to energize the step motor 90 through one step in the positive direction. If the sign of the number contained in the counter 42 is negative, the controller provides three pulses to the ring counter 108 at $T_3$, $T_4$ and $T_5$. These pulses cause the ring counter to step through three of its four stages at a rate so fast that the rotor of the motor 90 is incapable of responding to the intermediate stages but only responds to the last stage. Accordingly, at the end of the pulse sequence the coil of the step motor 90 is energized which causes the motor to step one unit in the reverse direction. This circuit allows a unidirectional ring counter, with its greatly simplified gating system, to step the motor in a bidirectional manner.

In a similar manner, output pulses from the OR gate 96 are provided to a controller 110 at such time as the AND gate 82 is energized by an output from the AND gate 64. The controller 110 also has an input from the most significant stage of the increment register 40. It controls a ring counter 112 to provide pulses to the step motor 88. A third controller 114 receives an output from the OR gate 96 at such time as the AND gate 80 is energized through the AND gate 62. The controller 114 also has an input from the most significant state of the register 38. The controller provides either one or three pulses to a ring counter 116 which services the step motor 86.

Each of the step motors is connected to drive the movable contact of a potentiometer. The step motor 90 drives the contact of a potentiometer 118, the step motor 88 drives potentiometer 120 and the step motor 86 drives potentiometer 122. Each of the potentiometers has a source of direct current voltage applied across it. The voltage is schematically illustrated by the batteries 124, 126 and 128. The voltages thus developed are respectively applied to the valves 16, 22 and 28, causing the valves to move through a distance proportional to the potentiometer setting. A voltage-to-current converter might be additionally employed in the circuit.

Summarizing the operation of the system, initially, the sub-system 36 scans the sensors 30 and 32, calculates increment numbers for the valves and inserts these numbers in registers 38, 40 and 42. When the sub-system 36 has completed its cycle, it provides an output on line 56 to clock 58. Assuming the register 60 to be preset to the number 001, the gates 68 and 80 are initially energized. At $T_1$ gate 68 senses the condition of the register 38 by means of the OR gate 70 and provides an output to the AND gate 80 via the OR gate 96. At $T_2$ the contents of the register 38 are decremented by one if they were non-zero. The AND gate 80 provides an output to the controller 114 which controls the application of either one or three pulses to the step motor 86 depending upon the sign of the number contained in the register 38. This requires pulse times $T_2$–$T_5$. At pulse time $T_6$ the contents of the register 60 are incremented by one via line 92. At $T_7$ the contents of the most significant stage of the register 60 are examined by the AND gate 94 and a signal is provided to the sub-system 36 if the scanning process has been completed. This terminates the application of signal line 56 to the clock 58 and the sub-system 36 regains control of the cycle.

If the contents of the most significant stage of the register 60 are still zero at $T_7$ then during the next cycle the contents of the register 40 are examined and signals are provided to the step motor 88 if the contents are non-zero. During the next cycle of the clock the contents of the register 42 are examined and pulses are provided to the stepping motor 86 if the contents are non-zero.

At the end of this third cycle the register 60 will be augmented so that ONE is contained in the most significant stage and the cycle will be terminated. At the same time the AND gate 94 provides a signal which initializes its register 60 to the contents 001. Alternatively, the contents of the register could be fully cleared. In that case, a portion of the first clock cycle following the initiation of the service routine would be wasted.

Figure 3:
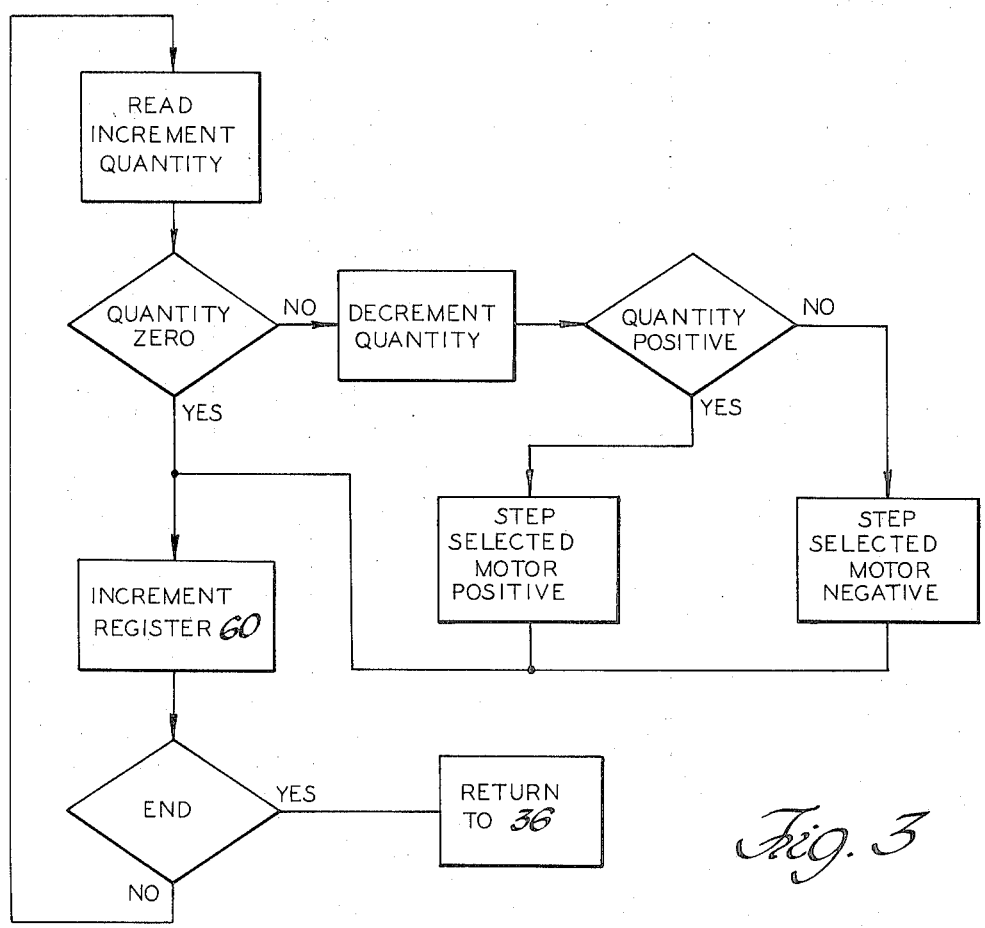
FIG. 3 is a flow chart illustrating the sequence of operation of the apparatus of FIG. 2.

This cycle of operation is illustrated in the flow chart of FIG. 3. The first step in the process is to read the increment quantity addressed by the register 60. If that quantity is zero, the next step is to increment the register 60. If the quantity is not zero, first the quantity is decremented by one and then the selected step motor is moved either positively or negatively depending upon its sign. Next, the register 60 is incremented and it is examined to determine if the cycle has ended. If the cycle has ended, control is returned to subsystem 36. If the cycle has not ended, the next increment quantity is read and the cycle is repeated.

The embodiments of the invention in which an exclusive property or privilege is claimed are defined as follows:

1. A control system including a plurality of output devices, each operative to change its state through an increment in either of two directions in response to an appropriate input signal; means for generating said input signals having a first or second form; a plurality of storage sections, one associated with each output device, operative to store signals representative of the number of increments through which its associated output device is to be changed, and a signal representative of the direction of change of said output; and means for sequentially scanning each of said storage sections and providing a single input signal to its associated output device and modifying said signal representative of the number of increments through which its associated output device is to be changed so as to decrement the number by one unit at such time as the signal contained in such section is non-zero, the signal having a first or second form depending on the signal representing the direction of change of said output device stored in said section.

2. The control system of claim 1 wherein the output devices consist of pulse responsive stepping motors and the control signal provided to an output device at such time as its associated storage section is scanned and is non-zero, comprises a pulse.

3. The control system of claim 2 wherein said stepping motors are bidirectional and the signals stored in each of said storage sections include a sign indicating the direction of motion of the stepping motor.

4. The control system of claim 1 wherein said means for sequentially scanning each of said storage sections includes a counter which is incremented following the scanning of each of the storage sections.

5. The control system of claim 1 wherein means are provided for terminating the scanning operation when all of the storage sections have been scanned.

6. In a control system having a plurality of output drives, each operative to move through one increment of motion in either a first or second direction in response to first or second control signals, respectively; a memory having a plurality of sections, one of which is allocated to each of said output drives; means for computing an output motion representing some number of increments for each of said drives, and a direction of motion and for storing the increment number and direction associated with each of said drives with its associated memory section; means for sequentially scanning each of said memory sections and for decrementing said number and providing either a first or second signal to the output drive associated with the particular memory section at such time as said memory section is scanned and its contents are non-zero.

7. The control system of claim 6 wherein each time an output is provided to a drive associated with a particular memory section the contents of that memory section are decremented by one increment.

8. The control system of claim 6 wherein said means for sequentially scanning each of said memory sections includes a counter which is incremented each time one of the memory sections has been scanned.

9. The control system of claim 8 wherein said counter is preset to a particular value following the scanning of the last memory section and prior to the scanning of the initial memory section.

10. A system for controlling a process having a plurality of controllable variables and a plurality of measurable variables related to said controllable variables, comprising: a plurality of sensors operative to provide signals representative of the values of said measureable variables; a computer operative to receive said sensor signals and to generate a plurality of signals, one for each controllable variable, representative of a desired change in the state of said variable in terms of an integral number of increments and a direction of said change; output devices connected to said process so that each controls one of said variables through one increment upon receipt of a particular control signal; storage means having a plurality of sections, one associated with each of said output drives, operative to receive the outputs of the computer representative of the required change and direction of change in each of the variables; and means for sequentially scanning said memory sections, decrementing said required change by one unit and providing particular output signals of either a first or second form to the output device associated with the particular memory section at such time as that memory section is scanned and its contents are non-zero, the form of said output signal depending on the direction of change stored in the memory section.

11. The control system of claim 10 wherein each time a particular output signal is provided to the output drive associated with a memory section, the contents of that memory section are decremented by one increment.

12. The control system of claim 10 wherein the means for sequentially scanning said memory section terminates its operation after all of the memory sections have been scanned.

13. The system of claim 10 wherein said means for sequentially scanning said memory sections and providing one of said particular output signals to the output drive device associated with the particular memory section at such time as the memory section is scanned and its contents are non-zero includes a counter which is incremented by one count after each memory section has been scanned and which is reset to an initial value after the last memory section has been scanned.

14. The system of claim 13 wherein said output drive devices constitute bidirectional stepping motors, the outputs of the computer representative of the required changes in each of the variables includes a sign, and said output signals may take one of two forms depending upon the sign associated with the contents of the memory section.

* * * * *

UNITED STATES PATENT OFFICE
CERTIFICATE OF CORRECTION

Patent No. 3,821,624          Dated June 28, 1974

Inventor(s) Rene M. Iadipaolo and William B. Jones

It is certified that error appears in the above-identified patent and that said Letters Patent are hereby corrected as shown below:

The correct name of the second inventor is --William B. Johns--.

Column 3, line 36 the numeral "26" should be --36--.
Column 4, line 62 "bit" should be --bits--.
Column 6, line 36 --a-- should appear before "ONE".

Signed and sealed this 26th day of November 1974.

(SEAL)
Attest:

McCOY M. GIBSON JR.                C. MARSHALL DANN
Attesting Officer                  Commissioner of Patents